United States Patent
Chen et al.

(10) Patent No.: US 10,346,399 B2
(45) Date of Patent: Jul. 9, 2019

(54) SEARCHING RELATIONAL AND GRAPH DATABASES

(71) Applicant: Hewlett Packard Enterprise Development LP, Houston, TX (US)

(72) Inventors: Qiming Chen, Sunnyvale, CA (US); Meichun Hsu, Sunnyvale, CA (US); Malu G Castellanos, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 261 days.

(21) Appl. No.: 15/327,729

(22) PCT Filed: Jul. 28, 2014

(86) PCT No.: PCT/US2014/048341
§ 371 (c)(1),
(2) Date: Jan. 20, 2017

(87) PCT Pub. No.: WO2016/018201
PCT Pub. Date: Feb. 4, 2016

(65) Prior Publication Data
US 2017/0212931 A1 Jul. 27, 2017

(51) Int. Cl.
*G06F 17/30* (2006.01)
*G06F 16/2453* (2019.01)
*G06F 16/25* (2019.01)
*G06F 16/248* (2019.01)
*G06F 16/2455* (2019.01)
*G06F 16/245* (2019.01)

(52) U.S. Cl.
CPC ...... *G06F 16/24544* (2019.01); *G06F 16/245* (2019.01); *G06F 16/248* (2019.01); *G06F 16/2455* (2019.01); *G06F 16/25* (2019.01)

(58) Field of Classification Search
CPC .................................................. G06F 17/30424
See application file for complete search history.

(56) References Cited

U.S. PATENT DOCUMENTS

| | | |
|---|---|---|
| 6,339,776 B2 | 1/2002 | Dayani-Fard et al. |
| 2004/0220942 A1 | 11/2004 | Agrawal et al. |
| 2010/0241644 A1 | 9/2010 | Jackson et al. |
| 2013/0046798 A1 | 2/2013 | Mankovskii et al. |
| 2014/0012882 A1 | 1/2014 | Poppitz |
| 2014/0201234 A1 | 7/2014 | Lee et al. |

OTHER PUBLICATIONS

Hartl, A., "A Visual Rendering of a Semantic Wiki Query Language," Institut Fur Informatik, Apr. 30, 2009, 122 pages.
Have, C.T. et al., "Are Graph Databases Ready for Bioinformatics?" National Center for Biotechnology Information, Oct. 17, 2013, 4 pages.

(Continued)

*Primary Examiner* — Hung Q Pham

(57) ABSTRACT

A technique includes in a relational database query engine, receiving a query associated with a relational data structure. The received query includes a database graph query. The technique includes using the relational database query engine to integrate a result acquired from the graph database engine into a result provided by the relational database query engine to the received query.

15 Claims, 4 Drawing Sheets

(56) References Cited

OTHER PUBLICATIONS

International Searching Authority, "Notification of Transmittal of the International Search Report and the Written Opinion", PCT/US2014/048341, dated Mar. 30, 2015, 14 pages.

Izso, B., et al. "Incquery-d: Incremental Graph Search in the Cloud." Proceedings of the Workshop on Scalability in Model Driven Engineering. ACM, 2013, 4 pages.

Ramanujam, S. et al. "R2D: A bridge between the semantic web and relational visualization tools," Semantic Computing, 2009. ICSC'09. IEEE International Conference on IEEE 2009 pp. 303-311.

Ramanujam, S. et al. "Relationalization of Provenance Data in Complex RDF Reification Nodes," Electronic Commerce Research 10.3-4 (2010): pp. 389-421.

SEARCHING RELATIONAL AND GRAPH DATABASES

BACKGROUND

For purposes of enhancing the retrieval and storage of large volumes of data, the data may be organized in a database. One type of database is a relational database in which data is stored in tables. In the relational database, a given table defines a relation among the data stored in the table; and relations may also exist among tables of the relational database. Another type of database is a graph database, which is based on a graph structure having nodes, properties and edges. The nodes represent entities, and the properties are pertinent information that relate to the nodes. The edges are the lines that connect nodes to nodes or nodes to properties; and a given edge represents a relationship between connected nodes or a relationship between a connected node and property.

DETAILED DESCRIPTION

Figure 1:
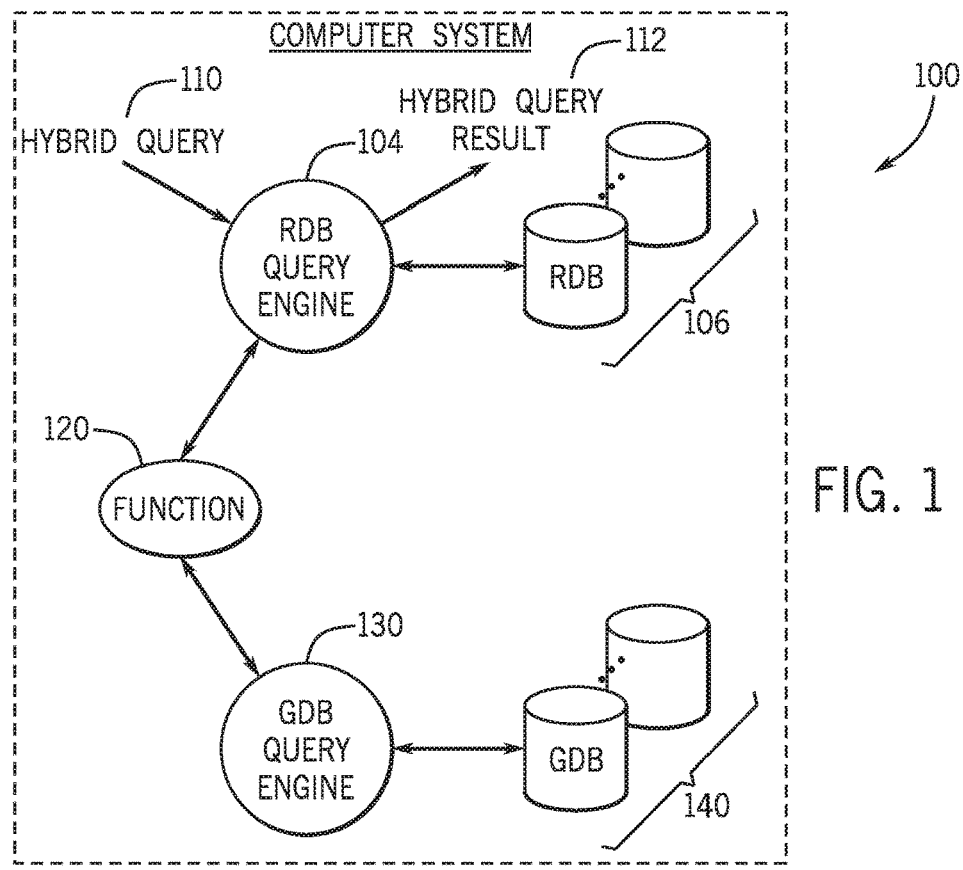
FIG. 1 is a schematic diagram illustrating a system to process a hybrid query containing a relational database query component and a graph database query component according to an example implementation.

Graph database technology is ever increasingly popular because many enterprises are facing the task of searching connection data, whether for (as examples) serving up online recommendations to millions of Internet users, managing master data hierarchies, or routing millions of packages per day in real time.

Although graph databases provide vital addition to information retrieval and management, the graph databases do not replace conventional relational databases, such as Structured Query Language (SQL) databases or data warehouses. The reality is that many enterprises maintain and use both relational databases as well as graph databases. Moreover, some applications may use information from external graph databases.

A relational database, in general, defines a structure in which the data is arranged in tables, where each table defines a relationship among its data. Moreover, the tables of the relational database may have certain relations among themselves.

A graph database has a structure that is based on graph theory. In this manner, a graph has nodes, properties and edges. The nodes represent entities, such as people, businesses, accounts or any other item that is tracked. The properties are pertinent information that relate to the nodes. The edges are the lines that connect the nodes to other nodes or connect the nodes to properties. The edge, in general, represents a relationship between a given node and another node or a relationship between a given node and a property. Quite often, the more pertinent information is stored in the edges. The connections and interconnections of nodes, properties, and edges often reveal meaningful patterns. The graph database provides index-free adjacency. This means that every element contains a direct pointer to its adjacent elements, without using index lookups.

Compared with relational databases, searches of graph databases may be orders magnitude faster for associative data sets, and graph databases may map more directly to the structure of object-oriented applications. Moreover, as compared to relational databases, graph databases may scale more naturally to relatively large data sets, as the graph databases often do not use computationally expensive join operations. As the graph databases depend less on rigid schema, the graph databases are more suitable to manage ad hoc and changing data with evolving schema.

In general, graph databases are relatively powerful tools for graph-like queries, such as, for example, a query that involves computing the shortest path between two nodes in a graph. Other graph-like queries may be performed over a graph database in a natural way, for example, using the graph's diameter computations or community detection. Relational databases may be relatively faster at performing the same operation on a large numbers of data elements. Thus, for many applications, it is beneficial to use relational databases in conjunction with graph databases.

Techniques and systems are described herein, graph traversal processing capabilities are described herein to process a query that is generally formatted according to a relational database (RDB) language protocol (such as SQL, for example) but contains one or multiple embedded queries associated with a graph transversal. Moreover, referring to FIG. 1, in accordance with example implementations, a computer system 100 includes a relational database (RDB) query engine 104 that receives and processes a hybrid query 110. The hybrid query 110 contains query components that are directed to different database types: an RDB query component (a SQL query, for example), which describes a relational database query: and a graph database (GDB) component (a Cypher query, for example), which describes a graph database query.

As an example, the RDB query engine 104 may be a SQL query engine, which is constructed to, in general, process queries that conform to the SQL format. Unlike conventional arrangements, however, the RDB query engine 104, for example implementations that are described herein, has the ability to process embedded graph queries, such as graph queries that conform to the Cypher format. As described in example implementations herein, the RDB query engine 104 parses the hybrid query 110 to extract RDB and GDB queries that are contained therein, outsource the GDB query(ies) to a GDB query engine 130 and process the query results for purposes of performing RDB queries on one or multiple relational databases (RDBS) 120, as well as performing database operations on one or multiple graph databases (GDBs) 140.

For purposes of processing the hybrid query 110, the RDB query engine 104 uses, or accesses, a function 120 that, in accordance with example implementations, may be defined in a user defined function (UDF), such as a SQL UDF, which is created as part of a user defined transformation function (UDTF). The function 120 is used in a way, in accordance with example implementations, that allows users to specify in a SQL query, for example, embedded Cypher query for traversing graphs, which may be embedded into a SQL query tree.

Figure 2:
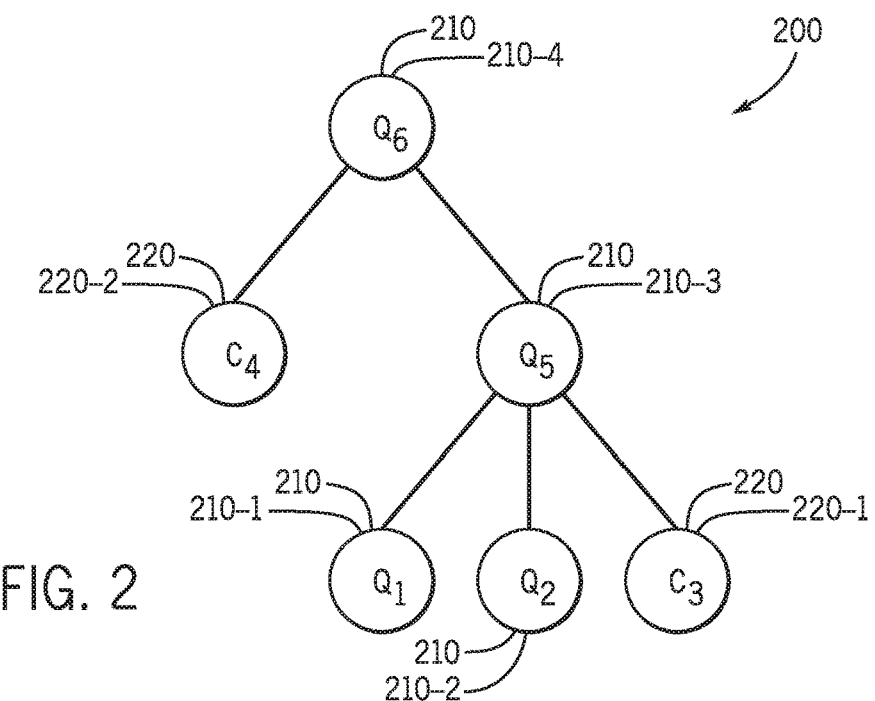
FIG. 2 is an illustration of a hybrid search tree according to an example implementation.

Referring to FIG. 2 in conjunction with FIG. 1, the RDB query engine 120 uses the function 120 to process a hybrid query 110 that may be represented by a hybrid query tree 210. As depicted in FIG. 2, the hybrid query tree 210 may contain RDB query expressions 210 (query expressions 210-1, 210-2, 210-4 and 210-3, being depicted as examples in FIG. 2), as well as GDB query expressions 220 (query expressions 220-1 and 220-2, being depicted as examples in FIG. 2). The function 120 causes the RDB query engine 104 to communicate, or outsource, processing of GDB query expressions to a GDB query engine 130 (see FIG. 1), which performs a corresponding search on the GDB(s) 140 and returns the search results to the RDB query engine 104. The RDB query engine 104, in response to the RDB query expressions 210, performs a search on the expressions and joins the RDB results with the GDB results to produce a corresponding hybrid query result 112.

Figure 3:
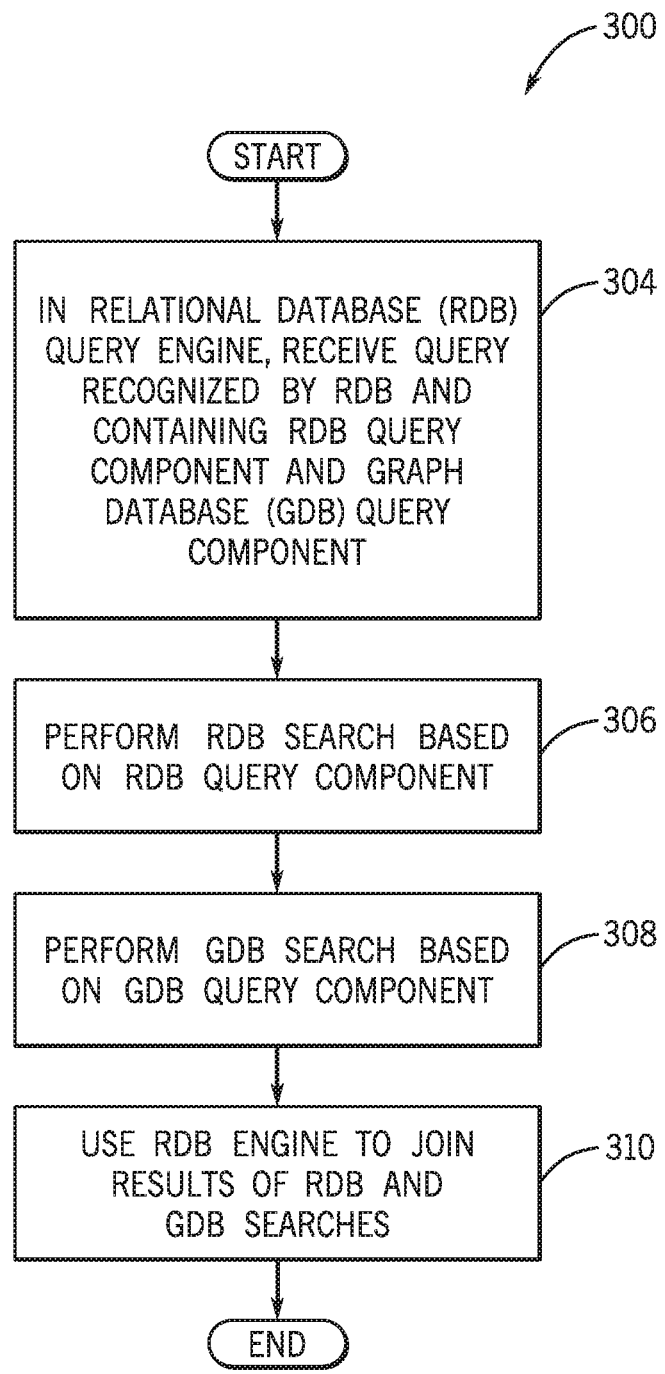
FIG. 3 is a flow diagram depicting a technique used by a relational database query engine to process a hybrid query containing a relational database query component and a graph database query component according to an example implementation.

To summarize, FIG. 3 depicts a technique 300 that includes in a relational database (RDB) query engine receiving (block 304) a query, which is associated with an RDB format (associated with a SQL format, for example) and contains an RDB query component and an embedded graph database (GDB) query component. Pursuant to the technique 300, an RDB search is performed (block 306) by the RDB query engine based on the RDB query component. Moreover, a GDB search query is performed (block 308) based on the GDB query component, such as a process that includes communicating a GDB query to a GDB query engine so that the GDB query engine processes the query to return a corresponding GDB search result. The RDB engine is then used (block 310) to join the results of the RDB and GDB searches.

As a more specific example, in accordance with example implementations, the Open Cypher Function (OCF) framework is used in a SQL-centered solution for allowing a SQL query engine to process a hybrid query, specifying query components for both a SQL search of a relational database and a cypher search of a corresponding graph database and without altering the SQL query engine. In general, the OCF framework allows users to specify Cypher statements for traversing graphs with results that are returned to the SQL query engine, where the GDB results are joined with the RDB result.

The OCF is supported automatically and systematically by the SQL standard, but is open for users to plug-in application specific logic for filtering or deriving the graph search results before feeding the results to the host SQL query. A default OCF, in accordance with example implementations, may be provided as a built-in function, which the user may use without coding an UDF. The OCF may also be extended to an UDF, with user provided, application specific logic, in accordance with further example implementations.

Figure 4:
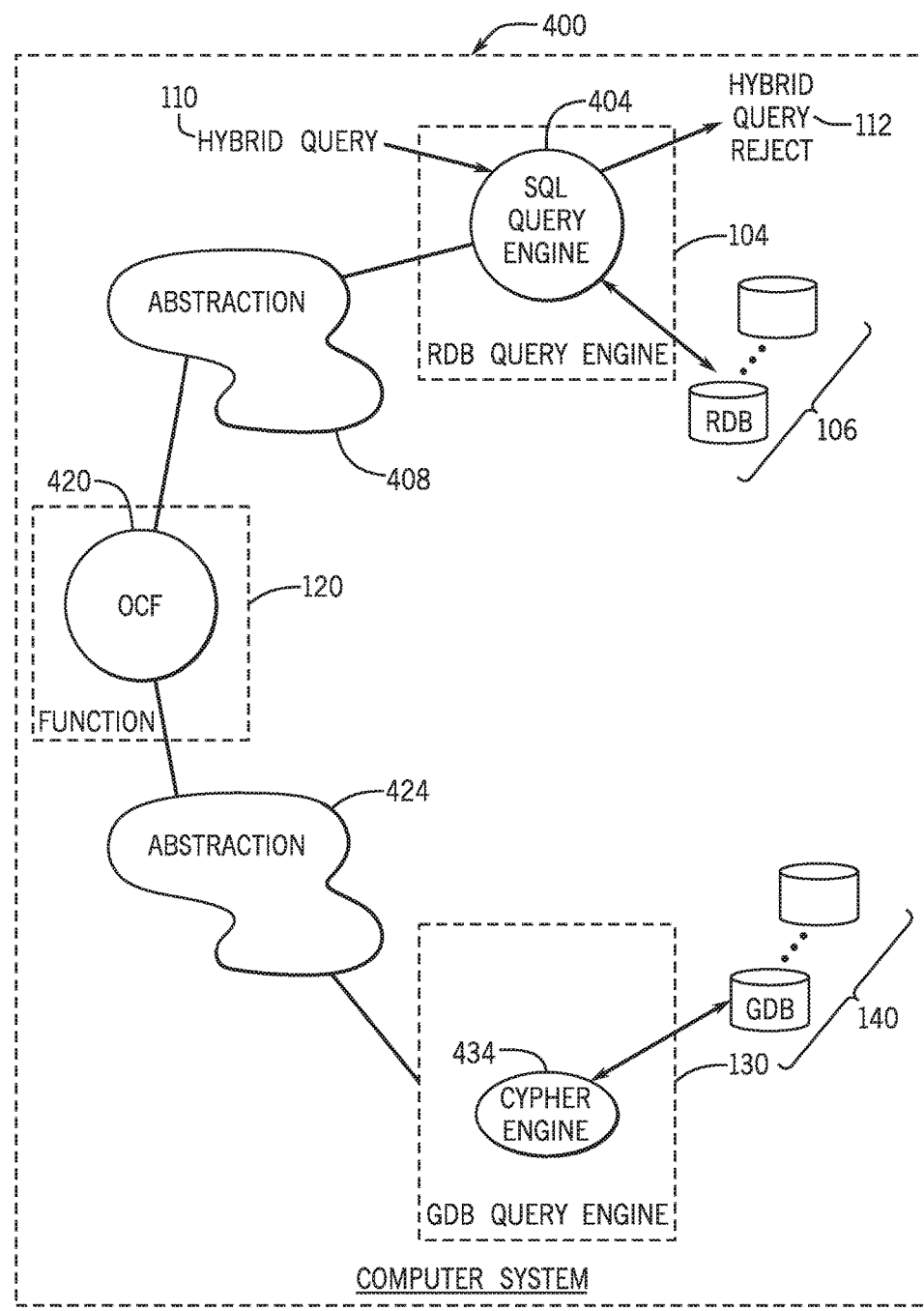
FIG. 4 is a more specific schematic diagram of a system to process a hybrid query according to an example implementation.

Referring to FIG. 4, as a more specific example, a computer system 400 includes a SQL query engine 404, which processes a hybrid query 110. For this example, the hybrid query 110 is a SQL-formatted hybrid query, which contains an embedded cypher query. As an example, the hybrid query 110 may be as follows:

SELECT movie_tule, year_released FROM cypher('Tom Hanks' using parameters servers='http://lava-c3n4.hpl.hp.com:7474/db/data', cypher='MATCH (actor:Person {name: "% 1"})-[:ACTED_IN]->(movies) RETURN movies.title, movies.released as year') OVER ( );

For this example hybrid query, the SQL query engine 404 returns the following hybrid query result 112:

| Movie_Title | Year |
|---|---|
| A League of Their Own | 1992 |
| The Polar Express | 2004 |
| Charlie Wilson's War | 2007 |
| Cast Away | 2000 |
| Apollo 13 | 1995 |
| The Green Mile | 1999 |
| The Da Vinci Code | 2006 |
| Cloud Atlas | 2012 |
| That Thing You Do | 1996 |
| Joe Versus the Volcano | 1990 |
| Sleepless in Seattle | 1993 |
| You've Got Mail | 1998 |

For purposes of processing the embedded cypher query, the system 400 includes an OCF 420. In general, the OCF handles the embedded cypher query as a user defined transformation function (UDTF), which is provided by the database management system that contains the query engine 404. Unlike a table scan, which is used by the SQL query engine 404 for reading relational data from tables, the engine 404 uses a function scan that is construed to read data from non-table resources, such as local or remote files or systems.

While the table scan is handled with the system-supported access method, the function scan is handled by a UDTF (such as the OCF 420, for this example). In other words, the UDTF, such as the OCF 420, for this case, receives and parses the data from a data source that is external to the underlying database and returns relation tuples to feed the hosting query.

In accordance with example implementations, the OCF 420 is executed by the SQL query engine 404, which causes the SQL query engine 404 to communicate a cypher query (using a Representational State Transfer (REST) protocol, for example) to a GDB query engine 130, which for this example is a cypher engine 434. The SQL query engine 404 may be further configured with application logic, which allow a user to tailor the graph search results (if used).

In this manner, the OCF 420, in accordance with example implementations, causes the SQL query engine 404 to use the REST protocol for purposes of connecting to the cypher engine 434; sending out the cypher statement receiving graph search results and turning those results into a relation (i.e., a set of tuples); and returning the resulting tuples to the host query. The SQL query engine 404 joins the SQL subquery result with the graph traversal result to provide the hybrid result 112.

As a UDTF, the OCF 420 uses the function registration service of the UDTF, as well as the operational service of the query executor. The OCF 420 may potentially interact with a REST protocol interface, the cipher engine 434 interface, as well as possible other system interfaces. In accordance with example implementations, for purposes of simplifying and avoiding potential coding complexity for dealing with system interfaces, the system 400 includes two abstractions 408 and 424: the abstraction 408 handles the interface between the UDTF and the SQL engine 404, making the OCF 420 transparent to UDTF developers; and the abstraction 424 handles the interface among the OCF 420, the REST protocol, and the cypher engine 434, making these interfaces transparent to the OCF developers.

Due to the abstractions 408 and 424, an OCF developer may merely specify the function signature and optionally, implement an abstract function to filter or derive the graph search results before feeding the processed results to the host query.

As a more specific example, the following abstractions may be developed to specify the function signature and optionally, implement an abstract function to filter or derive the graph search results before feeding the results to the host query:

```
public class CypherUdx extends AbstCypherUdx {
    @Override
    public String setInputTypes ( ) {
        return "varchar";
    }
    @Override
    public String setOutputSchema ( ) {
        return
"hostname:varchar(48),movie_title:varchar(128),
year_released:varchar(48)";
    }
    @Override
    public String setParameterTypes ( ) {
        return "servers:varchar(256), hosts:int, cypher:varchar(2048)";
    }
    //override an abstract method
    public void processResultTuple (ArrayList<String> tuple) {
        tuple.add(0, getHostname( ));
    }
};
public class CypherUdxFactory extends AbstCypherUdxFactory {
    public AbstUdtf setFunction( ) {
        return new CypherUdx( );
    }
};
```

In accordance with example implementations, it may be possible to make some assumptions for abstracting the OCF, while covering the most frequently-used cases. For example, in accordance with some example implementations, the following may be moved to the abstract class AbstCypherUdx to support the OCF with the given input signature without altering the graph query results:

```
@Override
public String setInputTypes ( ) {
    return "varchar";
}
@Override
public String setParameterTypes ( ) {
    return "servers:varchar(256), hosts:int, cypher:varchar(2048)";
}
//override an abstract method
public void processResultTuple (ArrayList<String> tuple) {
    tuple.add(0, getHostname( ));
}
```

As a result, the OCF may be specified as follows:

```
public class CypherUdx extends AbstCypherUdx {
    @Override
    public String setOutputSchema ( ) {
        return
"hostname:varchar(48),movie_title:varchar(128),
year_released:varchar(48)";
    }
};
public class CypherUdxFactory extends AbstCypherUdxFactory {
    public AbstUdtf setFunction( ) {
        return new CypherUdx( );
    }
};
```

For the above example, the output schema is application specific, i.e. cypher query specific, which prevents obstruction. In general, the OCF 420, being an UDTF, is registered to the database system before the OCF 420 is invoked. This means that the cypher query dependent output schema is unavailable at the registration time. However, in accordance with example implementations, an assumption may be made to specify the return types of the OCF 420 as a list of strings (given a maximal allowed list size) and registered column names, which may be modified dynamically at query time. In this manner, a "space holder" output schema may be specified in the super class; and then the super class is not abstract anymore because nothing is left for subclassing.

In general, two kinds of type casting may be provided: type casting inside the OCF 420 and type casting outside the OCF 420. For the type casting inside the OCF 420, the returned values from the cypher query are cast to strings. Outside the OCF 420, the string values are returned from the OCF 420 and may be cast to corresponding types for integer, float, data, timestamp, etc. in terms of the SQL cast functions to number, to data, to timestamp, etc. For example, a cypher SUM( ) result may be cast to a number.

With the above-described mechanisms, in accordance with example implementations, the OCF 420 becomes a system-defined function, and the developers may be freed from the complexities of coding. As an example, query then may resemble the following:

SELECT c1 AS movie_tule, c2 AS year_released FROM
 cypher('Tom Hanks' using parameters servers='http://
 lava-c3n4.hpl.hp.com:7474/db/data',
 cypher='MATCH (actor:Person {name: "%1"})-[:
 ACTED_IN]->(movies) RETURN movies.title, mov-
 ies.released as year') OVER ( );

In accordance with example implementations, a default OCF 420 may be provided as a built-in function, which the user may use without coding. The OCF 420 may also be extended to a UDF, with user-provided, application specific logic.

Figure 5:
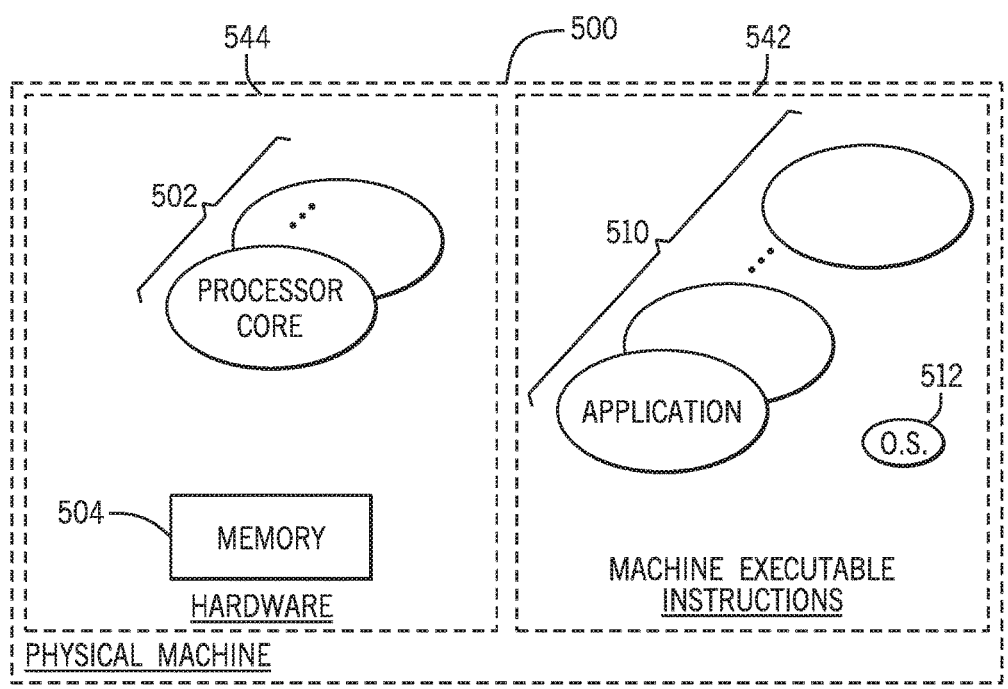
FIG. 5 is a schematic diagram of a physical machine according to an example implementation.

Referring to FIG. 5 in conjunction with FIG. 1, in accordance with example implementations, the above-described RDB(s) 106, GDB(s) 140, RDB query engine 104, GDB query engine 130, and so forth, may be implemented in the form of one or multiple physical machines 500.

In general, the physical machine 500 is an actual machine that is made up of actual machine executable instructions 542, or "software," and hardware 544. As examples, the hardware 544 may include one or multiple processor cores 502, which may be central processing units (CPUs), CPU packages, CPU processing cores, and so forth. The hardware 544 may further include memory 504, such as non-transitory memory storage formed from semiconductor storage devices, magnetic storage devices, optical storage devices and so forth. Moreover, the memory 504 may include volatile memory as well as non-volatile memory and may store, as examples, data for a database, program instructions for execution by processor core(s) 502 and program data. The machine executable instructions 542 may include one or multiple applications 510, such as an RDB query engine, a GDB query engine, or in general, machine executable instructions that when executed may perform part of all or any of the techniques that are disclosed herein. The machine executable instructions 542 may include, as an example, other instructions, such as instructions that form an operating system 512, device drivers, and so forth.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
 receiving, by a relational database query engine that includes a hardware processor, a query in a relational search language format, the received query comprising a relational database query component and a graph database query component;
 performing, by the relational database query engine, a relational database search on the relational database query component to provide a first search result;

executing, by the relational database query engine, an Open Cypher Function (OCF) on the graph database query component to cause the relational database query engine to communicate the graph database query component to a graph database query engine, wherein the graph database query engine is to perform a graph database search on the graph database query component to produce a graph search result as a second search result; and joining, by the relational database search engine, the first and second search results to respond to the received query.

2. The method of claim 1, further comprising:

parsing the received query to extract the graph database query component and the relational database query component.

3. The method of claim 1, further comprising:

prior to joining the first and second search results, transforming the graph search result produced by the graph database query engine into relation tuples, wherein the relation tuples are used as the second search result to be joined with the first search result.

4. The method of claim 1, wherein executing the OCF on the graph database query component as a user defined transformation function in the relational database query engine.

5. The method of claim 1, further comprising: accessing an abstraction that handles an interface between the OCF and the relational database query engine.

6. The method of claim 1, further comprising: accessing an abstraction that handles an interface between the graph database search engine and the OCF.

7. The method of claim 1, wherein executing the OCF to communicate the graph database query component to the graph database query engine comprises using a first type casting inside the OCF and a second type casting outside the OCF, wherein the first type casting inside the OCF causes returned values from the graph database query component to be cast to strings, and the second type casting outside the OCF causes the returned values to be cast to a number.

8. An article comprising a non-transitory computer readable storage medium to store instructions that, when executed by a computer that includes a relational database query engine, cause the computer to:

in the relational database query engine, receive a query associated with a relational data structure, the received query comprising an embedded graph database query component;

execute an Open Cypher Function (OCF) on the embedded graph database query component to cause the relational database query engine to outsource the embedded graph database query component to a graph database query engine, wherein the graph database query engine is to perform a graph database search on the embedded graph database query component to produce a graph search result; and integrate the graph search result acquired from the graph database engine into a result provided by the relational database query engine to respond to the received query.

9. The article of claim 8, the computer readable storage medium storing instructions that when executed by the computer, cause the computer to parse the embedded graph database query from the received query and communicate the parsed graph database query to the graph database query engine.

10. The article of claim 8, the computer readable storage medium storing instructions, that when executed by the computer, cause the computer to:

prior to integrating the graph search result into the result provided by the relational database query engine, transform the graph search result into relation tuples; and integrate the relation tuples into the result provided by the relational database query engine.

11. The article of claim 8, the computer readable storage medium storing instructions, that when executed by the computer, cause the computer to execute the OCF using a state transformation protocol to communicate with the graph database query engine.

12. A system comprising:

a processor; and a memory storing instructions for a relational database query engine, wherein the instructions are executed by the processor to cause the processor to:

receive a query in a relational search language format, the received query comprising a relational database query component and a graph database query component;

perform a relational database search on the relational database query component of the received query to provide a relational search result;

execute an Open Cypher Function (OCF) on the graph database query component to outsource the graph database query component to a graph database query engine, wherein the graph database query engine is to perform a graph database search on the graph database query component to produce a graph search result;

transform the graph search result received from the graph database query engine into relation tuples; and join the relation tuples with the relational search result to respond to the received query.

13. The system of claim 12, wherein the instructions are executable to cause the computer to: parse the graph database query from the received query and communicates the parsed graph database query to the graph database query engine.

14. The system of claim 12, wherein the instructions are executable to cause the computer to: access an abstraction that handles an interface between the graph database query engine and OCF.

15. The system of claim 12, wherein the instructions are executable to cause the computer to: access an abstraction that handles an interface between OCF and the relational database query engine.

* * * * *